United States Patent [19]

Gass et al.

[11] Patent Number: 4,774,704

[45] Date of Patent: Sep. 27, 1988

[54] INTERFACE CIRCUIT FOR CONNECTING A DIGITAL EQUIPMENT TO A TIME MULTIPLEX LINK

[75] Inventors: Raymond Gass, Bolsenheim; André Ruhlmann, Marmoutier, both of France

[73] Assignee: La Telephonie Industrielle et Commerciale Telic Alcatel, Strasbourg, France

[21] Appl. No.: 892,028

[22] PCT Filed: Oct. 16, 1985

[86] PCT No.: PCT/FR85/00296

§ 371 Date: Jul. 15, 1986

§ 102(e) Date: Jul. 15, 1986

[87] PCT Pub. No.: WO86/02513

PCT Pub. Date: Apr. 24, 1986

[30] Foreign Application Priority Data

Oct. 16, 1984 [FR] France .................. 84 15831

[51] Int. Cl.[4] .................. H04B 1/56; H04J 3/00
[52] U.S. Cl. .................. 370/29
[58] Field of Search .................. 370/29, 68, 84, 67, 370/85

[56] References Cited

U.S. PATENT DOCUMENTS

| 4,287,590 | 9/1981 | Boute et al. | 370/67 |
| 4,301,532 | 11/1981 | Janetzky | 370/85 |
| 4,351,049 | 9/1982 | Nobis | 370/85 |
| 4,373,183 | 2/1983 | Means et al. | 370/85 |
| 4,535,448 | 8/1985 | Baxter et al. | 370/85 |
| 4,536,877 | 8/1985 | Livington et al. | 370/85 |

FOREIGN PATENT DOCUMENTS 0009461 9/1979 European Pat. Off. .
8106812 4/1981 France .

OTHER PUBLICATIONS

J. P. Behr et al, IEEE International Conference on Communications, pp. 141-144, May 1984, Amsterdam NL.

Helmut Buenning et al, IEEE Transactions on Communications, pp. 2163-2171, Sep. 1982, New York.

Primary Examiner—Douglas W. Olms
Assistant Examiner—Wellington Chin
Attorney, Agent, or Firm—Sughrue, Mion, Zinn, Macpeak & Seas

[57] ABSTRACT

The invention relates to an interface circuit for connecting a digital equipment (2) for sending and receiving data to a time multiplex link (3). The connection interface circuit is provided with a bit send terminal (3E1) and a bit receive terminal (3R1) for connection to the corresponding wires (3E, 3R) of a time multiplex link (3) in parallel with other interface circuits (1 or 8) of equipments for transmitting and receiving digital data (2) or speech signals (4). The interface circuit includes a synchronization arrangement (12) enabling it to be connected to the multiplex link (3) in a manner identical to that provided for the interface circuit (8) of the transmitter/receiver equipments for speech signals (4) and to adapt itself automatically to the bit rate capabilities offered by the multiplex link. The interface circuit further includes transmit and receive register groups as well as a buffer register group disposed between the transmit and receive registers and a microprocessor of the digital equipment. Also included is a control arrangement for simultaneously driving the transmit and receive registers in connection with the synchronization arrangement, and for driving the buffer registers under the control of the microprocessor of the digital equipment.

5 Claims, 4 Drawing Sheets

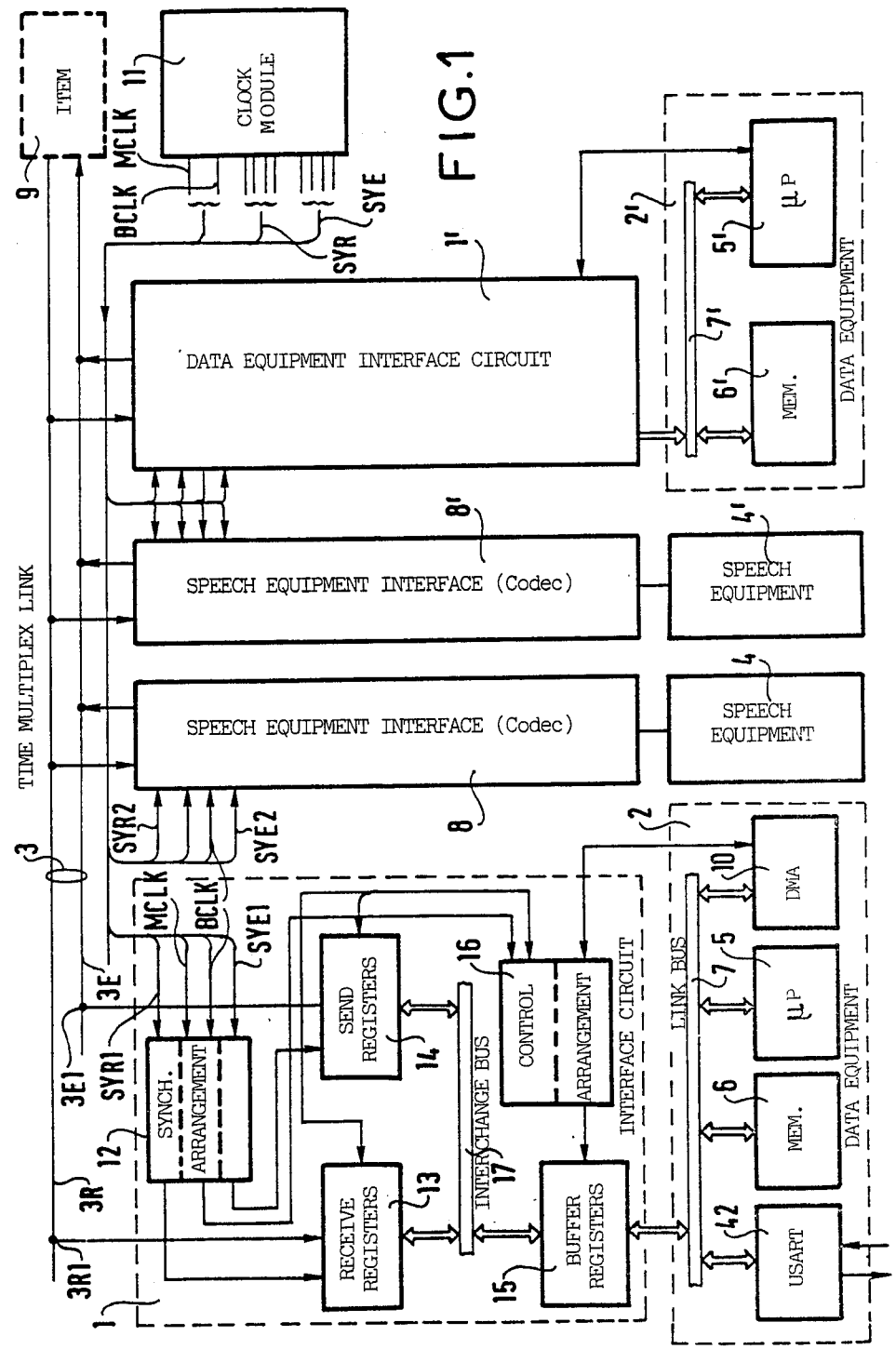

INTERFACE CIRCUIT FOR CONNECTING A DIGITAL EQUIPMENT TO A TIME MULTIPLEX LINK

BACKGROUND OF THE INVENTION

The present invention relates to an interface circuit for interconnecting a time multiplex link and a digital equipment comprising a data transmitter/receiver whicih is at least partially under its own control. The digital equipment may, for example, be a telephone set having a display, or a processor, or a controller for a multiservice subscriber.

The time multiplex link is preferably a two-way link designed to transmit data and/or speech signals that have been conventionally digitized on a byte-by-byte basis.

One such multiplex link under the control of a clock module constitutes, for example, a local communication network for data and/or speech signals between equipments connected thereto. Alternatively, it may be connected to a switching node in a network enabling equipments served by other multiplex links to be reached.

In a known manner, telephone sets are connected to such two-way multiplex links by converting interface circuits of the codec or cofidec type, each of which serves one or more telephone sets both for transmission and for reception.

The analog signals provided by the microphone of a telephone set are converted by the converting interface circuit serving that set into bytes each of which corresponds to one speech sample. These bytes are transmitted one-by-one over the same time slot of a time multiplex link during successive frames under the control of the clock arrangement which governs the link. This clock arrangement provides, in particular, a clock signal which is used by the converter circuit for its own internal operation, together with a synchronization signal which controls byte transmission.

The codec or cofidec type converter circuit serving a telephone set also receives a second synchronization signal from the clock arrangement in order to trigger taking account of bytes which are transmitted to the telephone set in question over a given time slot during successive frames, with the bytes which are taken into account then being converted into signals which can be used by the transducer in the telephone set being served.

Since codec or cofidec converter circuits are standardized for a given type of coding (A-law or U-law) and for a selected basic time multiplex link (24, or 30/32 time slots), it is possible to connect codec or cofidec circuits of the same standard to a corresponding time multiplex link simply by connecting them in parallel, so long as the number of time slots required by these circuits corresponds to the number of time slots available on the link.

However, connecting digital equipment which transmits/receives data to a time ultiplex link conventionally requires the addition of a data interchange interface for taking account of differences in clocks, data rates, and/or formats which exist between the digital equipment and the time multiplex link, in order to make them compatible with each other.

In particular, digital equipment designed to transmit or receive digital data generally includes control logic based on a microprocessor, which is at least partially dedicated to such control. The exchange and/or processing of data by digital equipment often makes use of messages which may be variable in format and/or longer than the single byte which is used as the standard time slot format in two-way time multiplex links of the telephone type.

Consequently, the data interfaces associated with such equipments for connecting them to time multiplex links are generally designed on a case-by-case basis. They are not directly reusable, which makes them expensive and inconvenient insofar as they cannot be mass produced and they lead to an increase in the number of different circuits that need to be stored as spare parts.

SUMMARY OF THE INVENTION

The present invention thus provides an interface circuit for connecting a digital equipment, at least partially under its own control, for transmitting and receiving digital data to a two-way time multiplex link suitable for transmitting, in byte form, digital data or speech signals converted into a suitable binary form by specialized interface circuits connected in parallel to the time multiplex link, under the control of a clock module governing byte transmission and receptio by means of clock signals and synchronization signals which are associated with the different time slots available during each frame of the time multiplex link.

According to a characteristic of the invention, said connection interface circuit being provided with a bit transmission terminal and a bit reception terminal enabling it to be connected to the corresponding wires of the time multiplex link in parallel with other interface circuits of equipments for transmitting and receiving digital data or speech signals, includes a synchronization arrangement comprising firstly a local clock generator suitable for receiving from the clook module both a common clock signal and a link bit rate controlling clock signal whose frequency is equal to the frequency of the common clock signal or to a submultiple thereof, and secondly two time slot selection units, one for transmission and the other for reception suitable for receiving the corresponding synchronization signals, in such a manner as to obtain a connection between the connection interface circuit and the time multiplex link which is identical to the connection provided for the interface circuits for converting speech signals, and for automatically adapting to the bit rate capacity provided by the selected time multiplex link.

BRIEF DESCRIPTION OF THE DRAWINGS

The invention, its characteristics and its advantages are described in the following description with reference to the figures listed below, in which:

FIG. 1 is a diagram of a connection interface in accordance with the invention, in its environment which is constituted by a two-way time multiplex link to which it is connected and by other circuits which are served by or associated with the connection.

DETAILED DESCRIPTION OF THE INVENTION

Figure 2A:
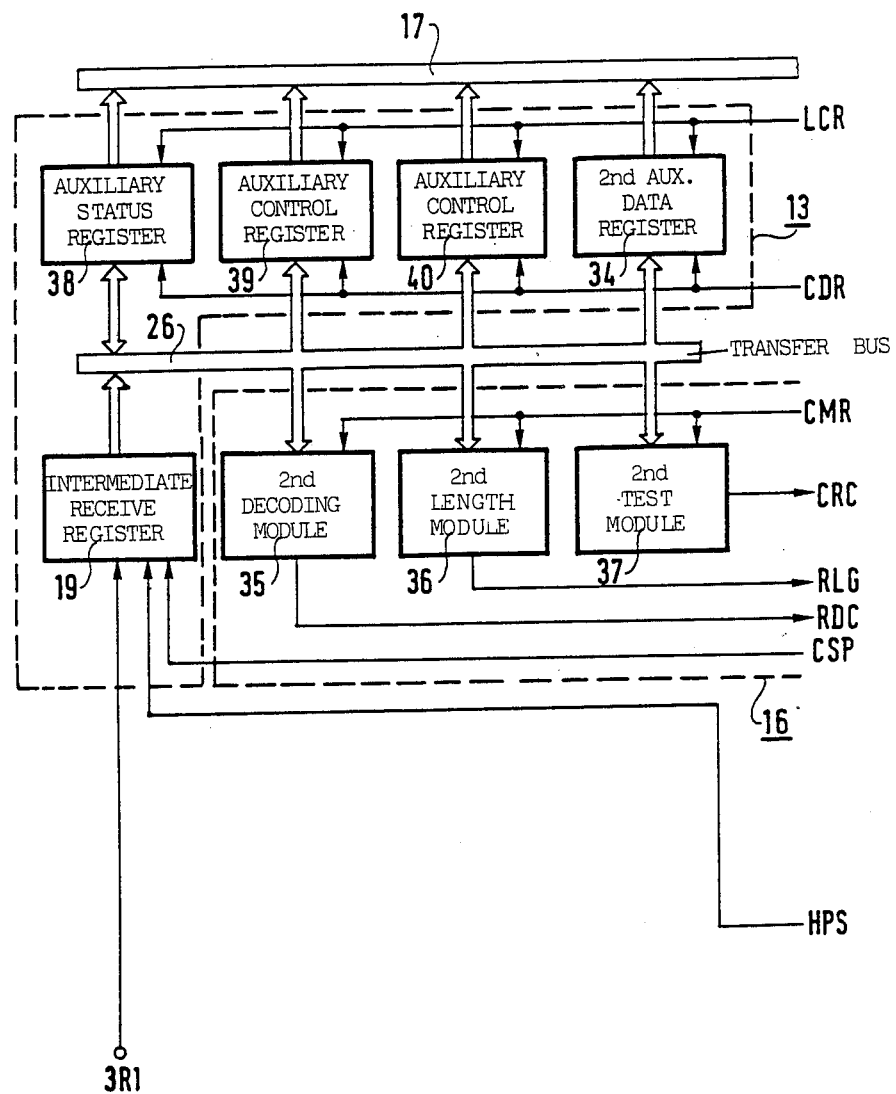
FIGS. 2A, 2B, and 2C constitute a detailed circuit diagram of a connection interface in accordance with the invention.

The connection interface circuit 1 shown in FIG. 1 is intended to connect a digital equipment 2 for transmitting and receiving data to a time multiplex link 3 which may serve other identical specialized interface circuits, such as the connection interface circuit 1' of a digital equipment 2' which likewise transmits and receives data, or other compatible circuits such as conversion interfaces 8, 8' of the codec type which are provided to serve transmitter/receiver equipments for speech signals 4, 4'.

The digital equipments 2, 2' may be of widely different types, and may range, for example, from the display equipment for telephone sets equipped with displays, to processors for controlling a switching network in which the multiplex link 3 may, optionally, constitute a part. The common characteristic of such digital equipments is that they are capable of being connected to the two-way time multiplex link 3 which has been selected because of the compatibility in form and bit rate of the data which may be transmitted or received by the equipment and the data which may be conveyed by said time multiplex link 3.

For well-known reasons concerned with the handling of data interchanges, each digital equipment 2 must include means enabling it to interchange signalling messages with other equipments with which it is suitable for communicating, either to interchange data or else to establish a path for such data interchange.

These means are preferably constituted by a mirroprocessor fitted with a set of memories and optionally associated with a direct memory access (DMA) device, such as the microprocessor 5 fitted with a set of memories 6 and with a DMA 10, and communicating therewith over a link bus 7 for the digital equipment 2. A USART type connection unit 42 is also capable of being connected to the link bus 7 in order to provide two-way transfer of digital data with external apparatus (not shown).

In a known manner, as symbolized by the equipment 2' in FIG. 1, a microprocessor 5' may also directly access a set of memories 6' via a bus 7' connected thereto, although this naturally increases the time during which the microprocessor 5' is not available for other tasks.

In either case, the microprocessor has occasion to transmit and receive data over the time multiplex link 3 via the link bus which serves it. If the equipment includes a DMA device 10, the DMA controls the data transfers requested of it from the time of multiplex link 3 to the set of memories 6, or in the opposite direction.

The speech signal transmitter/receiver equipments 4, 4' are conventionally the audio equipments of telephone sets and the conversation interface circuits 8, 8' serving them are conventionally codecs or cofidecs having the functions mentioned above.

The two-way time multiplex link 3 is conventionally provided to serve one, or more usually several specialized interface circuits 1 and/or 8 which share the available time slots. It is controlled by a clock module 11 which controls transfers of samples and digitally encoded speech signals and/or digital data via the time slots. The data and digitized speech samples are conventionally in the form of eight bit bytes.

The clock module 11 provides a common internal clock signal MCLK used for the internal operation of the specialized interface circuits 1 and 8, and a bit rate controlling clock signal over a link BCLK. The bit rate controlling clock signal BCLK over the multiplex link 3 has a frequency equal to or a sub-multiple of the frequency of the common internal clock signals MCLK, thereby enabling the line bit rate to be adapted to the requirements and the capabilities of the transmitter/receiver equipments 2 or 8 served thereby.

In one embodiment, the frequency of the common internal clock signal is two thousand and forty-eight kilohertz for a bit rate controlling clock signal at a frequency equal to the product of sixty-four kilohertz multiplied by a lower of two not greater than two to the power five.

The clock module 11 also supplies synchronization signals SYE and SYR for the various time intervals corresponding to the different time slots in the two one-way links 3E and 3R which operate in opposite directions an which together constitute the time multiplex link 3. Each specialized interface circuit 1 or 8 is connected by one terminal to each one-way link 3E, 3R, e.g. the connection interface circuit 1 is connected by terminals 3E1 and 3R1 to the two wires which respectively constitute the one-way links 3E and 3R.

Each specialized interface circuit 1 or 8 thus receives the clock signals MCLK and BCLK over two links MCLK and BCLK which signals are common to all of the specialized interface circuits of a given time multiplex link, and it further receives synchronization signals SYE and SYR over two specific links, which signals are specific to transmission and to reception for the time slots attributed to the, circuits in question, e.g. the links SYE1 and SYR1 for the connection interface circuit 1 and the links SYE2 and SYR2 for the conversion interface circuit 8.

This makes it possible to attribute one or several time slots on each one-way link 3E or 3R during successive frames as a function of the capacity of the link and of the requirements of the transmitter/receiver equipments served thereby, which equipments are all identically connected via their specialized interface circuits 1 or 8 having their respective transmission terminals connected to the one-way link 3E, known as the transmission link, and their respective reception terminals connected to the one-way link 3R known as the reception link.

The time multiplex link 3 is suitable for being used in several configurations for interchanging data and/or digitized speech signals between data transmitter-receiver equipments.

In a first configuration example the one-way transmission link 3E and the one-way reception link 3R are connected to each other at a point symbolized in this case by an item 9, and such a configuration makes it possible to interconnect transmitter/receiver equipments 2 or 4 which are connected to the line by their specialized interface circuits 1 or 8 using a rigid organization in which each specialized interface circuit is attributed to one or more fixed time slots both for transmission and for reception.

In a second configuration example, the multiplex link 3 includes an item 9 which controls the one-way transmission link 3E and the one-way reception link 3R in such a manner as to constitute a connection bus between the transmitter/receiver equipments. The controller item 9 may be constituted by a connection interface circuit 1 associated with a microprocessor, e.g. in accordance with one of the arrangements shown in FIG. 1.

In a third configuration example, the one-way links 3E and 3R are separately connected to a coupler of a time switching node within the item 9, with a transcoder allowing the equipments connected to these two links to communicate with equipments connected to other time multiplex links (not shown) for example via at least one time division telephone exchange or via a stage of such an exchange.

The connection interface circuit 1 per se is constituted by an integrated circuit and is provided with a group of receive registers 13 connected to the terminal 3R1 from which it receives digital data supplied by the one-way link 3R and destined for the digital equipment 2 during time slots which are attributed thereto during successive frames. The interface circuit 1 is also provided with a group of send registers 14 connected to the terminal 3E1 via which data is sent over the one-way link 3E during time slots which are attributed thereto for transmission.

A synchronization arrangement 12 receives the clock signals MCLK and BCLK transmitted over the links having the same references and also receives the synchronization signals transmitted over the links SYE1 and SYR1, and separately supplies the control signals for recording the digital data coming from the link in the set of receive registers 13 and for outputting digital data to be transmitted over the one-way link 3E from the set of send registers 14.

A group of buffer registers serves to interchange data between the groups of registers 13 and 14 with which the buffer registers 15 are connected via an interchange bus 17 and the data transmitter/receiver equipment via its link bus 7 to which the buffer registers 15 are also connected.

This group of buffer registers 15 interchanges data between the digital equipment 2 and the interface circuit 1 by matching the data format, throughput, and bit rate to enable data to be interchanged with the groups of send registers 14 or receive registers 13.

Data interchanges between the groups of registers 13 or 14 and the groups of buffer registers 15, and data interchanges between the groups of buffer registers 15 and the digital equipment 2 are under the control of an interface control arrangement 16.

The control arrangement 16 is connected firstly to the synchronization arrangement for data interchanges concerning the groups of receive registers 13 and send registers 14, and secondly with the microprocessor 5 and/or the DMA device 10, which are specifically connected thereto for interchanges between the group of buffer registers 15 and the digital equipment 2.

Figure 2B:
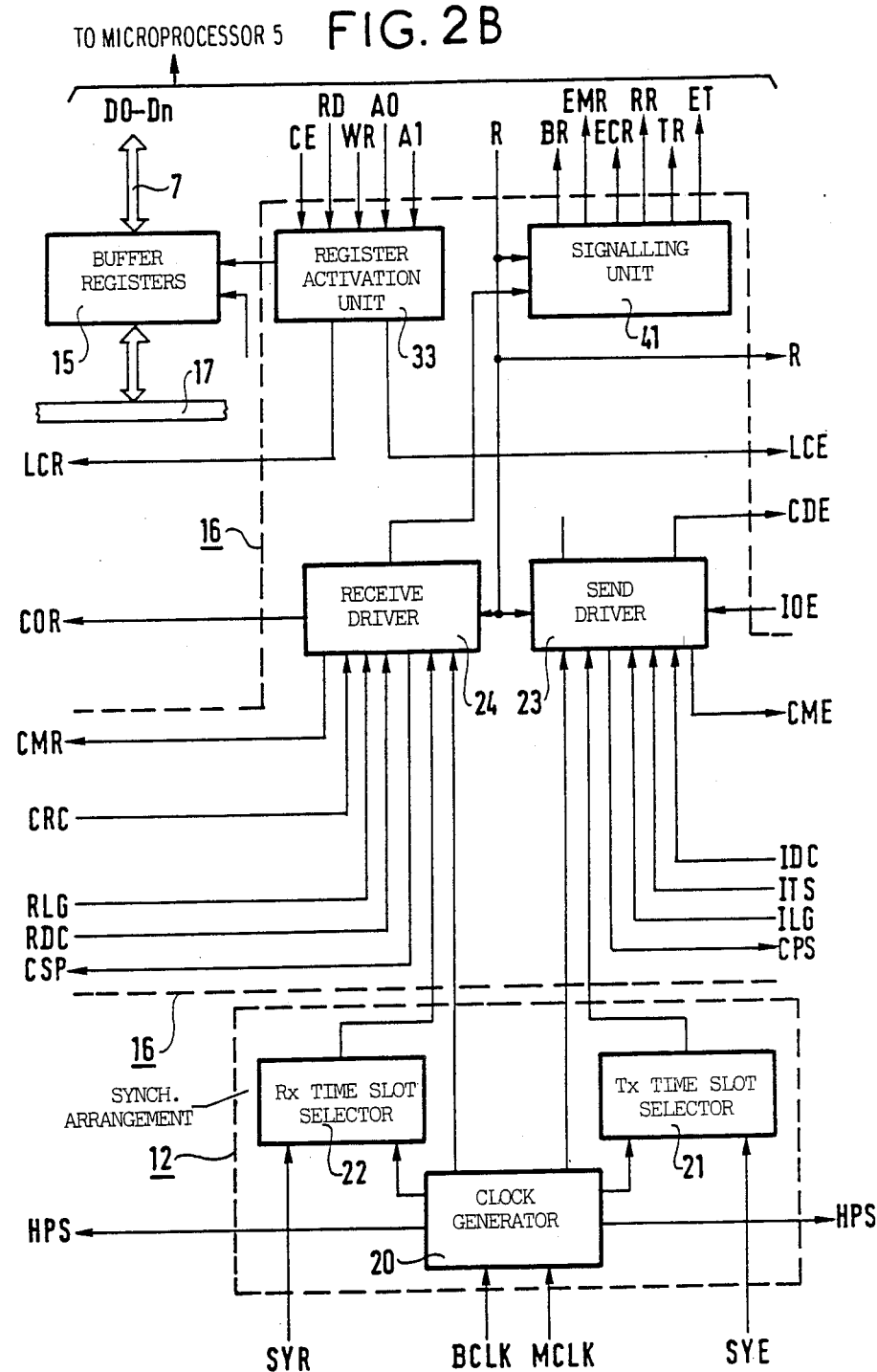
Figure 2C:
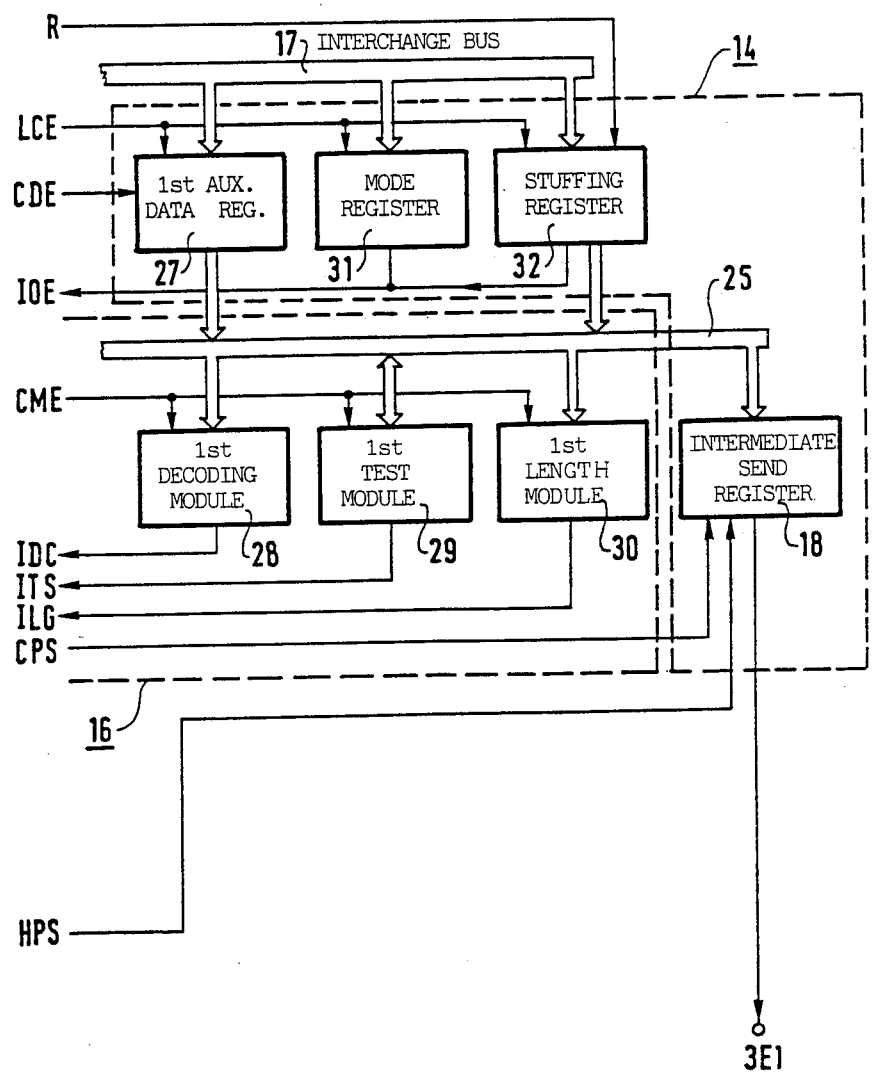

The structure and the operation of the interface are described in greater detail with reference to FIG. 2 for a time multiplex link 3 which is a conventional link having a frame of one hundred and twenty five microseconds duration divided into a number of time slots which is a multiple of eight, in particular twenty-four, thirty-two, sixty-four, one hundred and twenty-eight, or two hundred and fifty-six time slots, each of which conveys one eight-bit byte, thus enabling one speech sample to be transmitted per time slot for telephone communications, or enabling data to be transmitted via a channel comprising a single time slot or multiple time slots using a format which is equal to one byte or to a multiple of bytes.

Signalling for requests, instructions, and optional hand-shaking is performed in this case in the form of messages having the same format as is used for sending data.

The interface circuit 1 is thus suitable for dealing with different types of message including control messages and data messages which may occupy one or more time slots in a frame. Data messages are preceded in this case by a flag byte, and optionally by a length byte, and they are terminated by a check byte. Control messages comprise two first bytes, one of which defines the transmitter digital equipment 2 and the other of which defines the destination digital equipment 2, one or more intermediate bytes defining the control signal per se, and a last byte which is a check byte.

It is thus possible to choose a protocol which is adapted to the needs of the terminals in such a way as to avoid penalizing the network by transmitting control messages which are pointlessly long or complex.

The transmission links 3E and the reception links 3R of the time multiplex link 3, each constituted by a single wire in this case, are respectively connected to the output of an intermediate send register 18 (of the parallel-series type in this case) and to the input of an intermediate receive register 19 (a series-parallel type register in this case) which ensure byte-by-byte transmission or reception as the case may be to or from the time multiplex link 3 and the interface circuit 1.

To this end, each of the intermediate registers 18 and 19 is connected to the synchronization arrangement 12 in order to receive clock signals via two links HPS which serve them independently for bit-by-bit reception or transmission.

As indicated above, the synchronization arrangement 12 receives a clock signal MCLK for driving the internal operation of the interface circuit, said clock signal, which may be at 2048 kHz, is applied in this case to a conventional clock generator circuit 20.

As indicated above, the synchronization arrangement 12 also receives a olock signal BCLK from the clock module 11 mentioned with reference to FIG. 1. This signal indicates thereto the time intervals which correspond to the time slots reserved for the interface circuit 1.

The intermediate registers 18 and 19 of the interface circuit 1 are activated for transmission or reception as the case may be for each of the time slots in the frame which are reserved by the interface circuit 1 for its own needs.

The clock generator circuit 20 also receives a clock signal BCLK provided by the clock module 11 for each of the time slots of the channel set up on the time multiplex link 3 for the interface circuit 1.

The clock generator circuit 20 is connected both to a transmission time slot selector unit 21 and to a reception time slot selector unit 22, both of which are conventional and which also receive the synchronization signal SYE or SYR as appropriate and as supplied to them by the reference time base 11 during the time intervals of the time slots reserved for the interface circuit 1.

These time slots selection units 21 and 22 respectively control a send driver 23 and a receive driver 24, and the corresponding intermediate register 18 or 19 via the corresponding driver.

The drivers 23 and 24 are constituted, for example, by means of programmed logic networks grouped in pairs in such a manner that in each pair a first logic network controls the successive states of an operating sequence while the other logic network generates the enabling signals for the various controlled members, in the well-known manner.

The send driver 23 receives clock signals generated by the clock generator circuit 20 as does the receive driver 24, it produces a send control signal CPS for the intermediate send register 18 when all the conditions required for transmission are satisfied, and in particular when the time interval arrives for sending the byte which is present in said intermediate send register.

Similarly, the receive driver 24 produces a receive control signal CSP when all the receive conditions are satisfied and in particular when the time interval arrives which corresponds to the time slot or to one of the time slots reserved for the connection interface 1 at that time.

Each of the intermediate registers 18 and 19 is associated with plurality of auxiliary registers in the group of registers 14 or 13 in which it is included, and it is connected to these auxiliary registers via a transfer bus 25 or 26 which also serves specialized modules 28, 29, and 30, associated with transmission for the transfer bus 25, and specialized modules 35, 36, and 37, associated with reception for the transfer bus 26.

The send intermediate register 18 is thus connected via its inputs to the transfer bus 25 in such a manner as to receive the data coming from the digital equipment 2 served thereby, which data is supplied to the intermediate register byte-by-byte via a first auxiliary data register 27 whose inputs are connected to the interchange bus 17 of the interface 1. The send driver 23 controls reading of this first data register 27 via a link CDE when the conditions for transmission, as specified below, are satisfied.

A first specialized decoding module 28 is connected to the output from the auxiliary data register 27 via the transfer bus 25.

This first decoding module 28 is of the hard-wired logic type and has the purpose of detecting flag bytes at the beginnings of messages and of detecting control bytes, and also of detecting so-called empty bytes transmitted over the one-way link 3E when the send time slot(s) reserved for an interface circuit 1 are temporarily unused by said connection interface.

The first decoding module 28 is connected to the send driver 23 via a link given the reference IDC in this case in order to inform it that the specific byte mentioned above has been supplied by the auxiliary data register 27 to the intermediate send register 18.

A first test module 29 is connected to the output from the auxiliary data register 27 via the transfer bus 25, and serves to verify that the transmitted message is correct. To this end, each byte transmitted by the auxiliary data register 27 is used to generate a check byte, for example a cyclic redundancy check (CRC) byte which is obtained by performing an exclusive OR operation between each bit of the transmitted byte and the same number bits of the CRC byte established for the previously transmitted byte, with the last of the calculated CRC bytes being conveyed to the intermediate send register 18 at the end of the message to enable said last CRC byte to be checked by comparing it with a CRC byte calculated in identical manner by the receiving digital equipment 2.

The first test module 29 which is connected for two-way data transfer with the transfer bus 25 is also connected to the send driver 23 firstly by a link referenced ITS for checking the results of the successive CRC byte calculations, and secondly by a control link referenced CME for triggering transmission to the intermediate send register 18 of the last CRC byte intended to be sent at the end of the message.

A first length module 30 is also connected to the output of the auxiliary data register 27 by the transfer bus 25 in the driver 16, and it is controlled like the other modules by the send driver 23 via the link referenced CME.

This first length module 30 receives bytes indicating lengths of messages to be sent, which bytes are provided by the microprocessor 5 of the associated digital equipment 2 in respect of long messages. It is constituted by a conventional down counter which is preset by the length-indicating byte provided for a message and which is caused to count down by the send control circuit 23 via the link referenced CME each time a byte is sent over the one-way transmission link 3E. At the end of counting down from the position predetermined by the length-indicating byte, the first length module 30 supplies an end-of-current-message indication via a link referenced ILG.

An auxiliary or mode register 31 is connected via the interchange bus 17 to the output from the group of buffer registers 15. This auxiliary mode register 31 is intended to store information specific to transmission as supplied thereto by the microprocessor 5 via its link bus 7 and the group of buffer registers 15 for use by the send driver 23.

This send information defines the send protocol selected by the sending microprocessor 5, and is stored in binary form on the various bits of a specific byte including one bit position for requesting that a message be sent, another bit position for requesting a byte be sent without a check procedure, and in particular without the CRC test mentioned above, another bit for stopping transmission, and at least one more bit for resetting to zero to send successive empty bytes under the control of the microprocessor 5.

It is thus possible to choose the transmission protocol which is best adapted to the message to be transmitted, and in particular to use a procedure which uses few bytes when the message to be transmitted is short.

An auxiliary stuffing register 32 is also provided which is connected in parallel with the auxiliary registers 30 and 31 at the output from the bus 17 for cases where the multiplex link 3 is used as a local network interconnecting interface circuits 1 which are directly connected in parallel thereto, and in order to allow specific and generally repetitive bytes to be sent (and optionally a specific number thereof) over the link at the request of the microprocessor 5, such bytes including transmission request bytes DE, acquiescence bytes, or empty bytes. This makes it possible to avoid using specific calling links.

The auxiliary stuffing register 32 informs the transmission driver 23 of its status via a link referenced IOE which it shares in this case with the auxiliary mode register 31.

The three auxiliary registers 27, 31, and 32 of the group 14 are driven by a conventional activation unit 33 which depends from the microprocessor 5 and which serves to apply write commands, read commands, and addressing to said registers via a multi-wire link referenced LCE. The activation unit 33 is connected to the microprocessor 5 via an activation link CE, via write and read control links WR and RD, and via addressing links A0 and A1, and it performs these same functions for the group of receive registers 13 and the group of buffer registers 15.

A physical reset to zero command from the digital equipment 2 is transmitted via a link R to the circuits concerned, in particular the send driver 23 and the receive driver 24, and also to the stuffing register 32, if so required.

As indicated above, the intermediate receive register 19 is associated with a plurality of auxiliary registers in the group of registers 13 in which it is included.

A second auxiliary data register 34 has its inputs connected to the outputs from the intermediate receive register 19 via the transfer bus 26 in such a manner as to successively receive the bytes coming from the one-way reception link 3R at the time slots attributed to the digital equipment 2 or more specifically to its interface circuit 1.

This auxiliary data register 34 records the bytes it receives from the intermediate receive register under the control of the receive driver 24 which is connected its write inputs via a link reference COR, and it outputs these bytes to the interchange bus 17 to be received by the group of buffer registers 15 under the control of the activation unit 33 which is connected thereto by a control link referenced LCR.

A second specialized decoding module 35, identical to the first decoding module 28, is connected by the transfer bus 26 to the output from the intermediate receive register 19, and it detects flag bytes at the beginnings of messages or at the beginnings of commands, as well as empty bytes appearing at the output from the intermediate receive register 19 in order to inform the receive driver 24 via a link referenced RDC.

A second length module 36, identical to the first length module 30, receives the length-indicating bytes transmitted at the beginnings of long messages coming from the one-way reception link 3R and the intermediate receive register 19. This second length module 36 provides an end-of-message indication to the receive driver 24 via a link referenced RLG after counting a number of bytes corresponding to the length indicated for a message being received.

A second test module 37 analogous to the first test module 29 is connected in parallel with the modules 35 and 36 to the output from the intermediate receive register 19 via the transfer bus 26, and serves to calculate a CRC byte for each transmitted byte. It also compares the last CRC byte calculated for a message with the CRC byte transmitted after the data of said message in order to inform the receive driver 24 of the result of the comparison, via a link referenced CRC.

The second modules 35, 36, and 37 of the control arangement 16 are individually controlled by selective sddressing from the receive driver 24 via a link referenced CMR.

An auxiliary status register 38 is connected firstly to the transfer bus 26 via its inputs and its outputs, and secondly to the interchange bus 17 via its outputs only. It stores the status of the interface circuit 1 both during transission and during reception, in order to inform the microprocessor 5 of the associated digital equipment of said status and optionally to enable said information to be transmitted in the form of at least one status byte via the one-way transmission link 3E. In the example described herein, the auxiliary status register 38 represents the following conditions: busy states of the interface circuit 1 during transmission and reception; end of data transmission and end of data reception states; end of received control message; identity or difference between the CRC byte at the end of a received message and the CRC byte calculated by the second test module 37; and finally failure of the first auxiliary data register 27 to be loaded in time durinig transmission and failure of the second auxiliary data register 34 to be read in time during transmission; all by means of a corresponding set of independent bits in order to make it possible for the necessary control and backup procedures to be taken.

At least one, and preferably two, auxiliary control registers 39 and 40 store control bytes which are usually provided in the form of two successive bytes by the receive wire 3R for the microprocessor 5 of the associated digital equipment 2, as mentioned above.

To this end, the two auxiliary control registers 39 and 40 are inserted between the transfer bus 25 and the interchange bus 17, they are controlled, as are the auxiliary data and status auxiliary registers 34 and 38 by the receive driver 24 via a link referenced COR, and by the activation unit 33 via a link referenced LCR for writing and reading respectively.

The receive driver 24 also controls a signalling unit 41 as a function of characteristic states.

The signalling unit 41 provides a series of status bits for a register (not shown) in the microprocessor 5, these bits are:

a bit BR indicating that a flag byte at the beginning of a message has been decoded;

a bit EMR and a bit ECR respectively indicating end of received message and end of received command;

a bit RR and a bit TR indicating the availability of the interface circuit 1 for transmission and reception respectively; and a bit ET for indicating the end of message transmission by the interface circuit 1.

During transmission, the interface circuit 1 conventionally sends its control messages over a time slot which is attributed thereto on the one-way transmission link, and its data messages over said time slot which may optionally be associated with other time slots in order to form a wideband channel, and likewise it receives control messages intended therefor over a time slot of the one-way reception link 3R to which other time slots may opticnally be associated in the same link in order to constitute a broadband channel if such a channel is required for transmitting data to the interface circuit 1.

In conventional manner which is not described in greater detail herein, the control arrangement 16 ensures that the various stages necessary for interchanging data over the interface 1 take place as required as a function of the preceding states of the driver and of the commands received both from the microprocessor 5 of the associated digital equipment and via the one-way reception link 3R of the time multiplex link 3.

We claim:

1. An interface circuit for connecting a digital data transceiving equipment to a time-division multiplex link, in parallel with other equipment transceiving bytes of data or digitized speech signals under the control of a clock module governing byte transmission and reception by means of (i) common clock signals and (ii) individual synchronization signals associated with the different time slots available during each frame of transmission on the time-division multiplex link, wherein said interface circuit is directly connected to said time-division multiplex link through a bit transmission terminal and a bit reception terminal and includes (i) a synchronization arangement for receiving the individual synchronization signals for the interface circuit and the clock signal from the clock module associated with said time-division multiplex link and (ii) a microprocessor served by a link bus over which the data to be transmitted and received are interchanged, characterized in that said interface circuit further includes: three groups of registers, including a first group for transmission connected to the transmission terminal of the interface circuit, a second group for reception connected to the reception terminal of the interface circit and a group of buffer registers inserted between the digital data transceiving equipment and said first and second groups of registers; and a control arrangement for simultaneously driving the reception and tranmission of said three groups of registers in connection said said synchronization arrangement and for driving the gorup of buffer registers under the control of the microprocessor of the digital equipment served thereby.

2. A connection interface circuit according to claim 1, characterized in that the first and second groups of registers (13, 14) identically include an intermediate register (18 or 19) which is connected firstly in parallel on the time-division multiplex link (3) either to receive or to send messages made up of bytes, and secondly to a transfer bus (25 or 26) respectively connecting the intermediate receive register (19) to specialized auxiliary receive registers (34, 38, 39, 40) for receiving data bytes, status bytes or control bytes, received over the time-division multiplex link (3), and the intermediate send register (18) to specialized auxiliary registers (27, 32) for sending bytes, in particular data bytes or signalling bytes to be sent over the time link, in such a manner as to store said bytes for different periods.

3. A connection interface circuit according to claim 2, characterized in that the control arrangement (16) includes a two-part send and receive driver (23, 24) controlling access to the intermediate send and receive registers (18, 19), writing to the specialized receive registers and reading from the specialized transmit registers, and also an activation unit (33) controlled by the digital equipment (2) being served and controlling access to the group of buffer registers (15), writing to the specialized send registers and reading from the specialized receive registers, on the basis of information provided by the receive driver (24) to the digital equipment via a signalling unit (41).

4. A connection interface circuit according to claim 3, characterized in that it includes at least one auxiliary or mode register (31) for storing information specific to transmission, which information defines the control bytes to be transmitted for use by the send driver (23) of the control arrangement (16) in order to adapt the messages sent to the requirements expressed either by the microprocessor (5) of the digital equipment (2) being served, or else via the multiplex link (3).

5. A connection interface circuit according to claim 3, characterized in that the auxiliary send registers include at least one stuffing register (32) for storing repetitive signalling bytes under the control of the send driver (23) for cyclically sending them over the multiplex link (3) via the intermediate send register (18) and under the control of the control arrangement (16).

* * * * *